United States Patent [19]

Hähn et al.

[11] Patent Number: 5,719,098
[45] Date of Patent: Feb. 17, 1998

[54] SORBENT BASED ON SMECTITIC CLAY MINERALS REACTED WITH ALKALINE ION EXCHANGER

[75] Inventors: Reinhard Hähn; Rolf Ahlers, both of Landshut, Germany

[73] Assignee: Sud-Chemie A.G., Germany

[21] Appl. No.: 578,905

[22] Filed: Dec. 27, 1995

Related U.S. Application Data

[63] Continuation of Ser. No. 170,376, Dec. 20, 1993, abandoned.

[30] Foreign Application Priority Data

Dec. 21, 1992 [DE] Germany .................. 42 43 340.1

[51] Int. Cl.⁶ ........................ B01J 20/12; B01J 29/06
[52] U.S. Cl. ........................ 502/407; 502/68; 502/410; 502/414
[58] Field of Search ...................... 502/68, 407, 410, 502/414

[56] References Cited

U.S. PATENT DOCUMENTS 5,450,817   9/1995   Hahn et al. ............................ 119/173

FOREIGN PATENT DOCUMENTS 2189125   10/1987   United Kingdom ........... A01K 1/015

*Primary Examiner*—Glenn Caldarola
*Assistant Examiner*—In Suk Bullock
*Attorney, Agent, or Firm*—Scott R. Cox

[57] ABSTRACT

A sorbent based on smectitic clay minerals with originally low water uptake ability wherein the smectitic clay minerals are chemically reacted with at least one solid ion exchanger in alkaline form.

37 Claims, No Drawings

SORBENT BASED ON SMECTITIC CLAY MINERALS REACTED WITH ALKALINE ION EXCHANGER

This is a continuation of application Ser. No. 08/170,376 filed on Dec. 20, 1993, now abandoned.

BACKGROUND OF THE INVENTION

The invention is directed to sorbents based on smectitic clay minerals with originally low swelling capacity. These sorbents are suitable for taking up any desired liquids; however, they are especially good as pet litter.

The keeping of pets in a largely urbanized environment is increasingly dependent on the use of litter materials. The task of these materials is to absorb the fluids given off by the animals and to suppress or prevent the development of odor if possible. Moreover, they are required to remove moisture from the semisolid, moist animal excrement and excretions, in order to reduce the development of odor. Good litter materials, furthermore, have the property of taking up the excreted or removed fluids by forming a compact clump, which can be removed in a simple and economical way. Therefore, an optimal animal litter has a high absorption capacity.

The products that can be found on the market include organic substances such as straw, sawdust, wood shavings, bark, porous synthetic beads, shredded paper, cellulose fibers, agricultural wastes, polyacrylates, etc. These are used by themselves or in mixtures with inorganic materials. The disadvantage of the organic litter materials is an often unsatisfactory clumping or consistency of the clump, as well as their tendency to bacterial decomposition, especially in conjunction with moisture.

There are also bentonite-based litter materials, as disclosed by U.S. Pat. Nos. 5,000,115, 4,657,881 and 5,000,115, for example, which have certain advantages over the organic litters. Through their ability to swell with aqueous liquids, the bentonites are capable of forming clumps. Because of this dumping, the portion of the litter wetted by the fluid can be removed separately, thus economizing on litter. The special structure of the bentonites is also responsible for their ability to adsorb unpleasant odors produced by the animal's excretions and excrement. Disposal of bentonites, furthermore, is not a burden on the environment.

According to the above-mentioned state of the art, sodium bentonites or mixtures of sodium bentonites and calcium bentonites are used as sorbents, e.g., litter material for pets. These sorbents can be used in granulated form.

However, sodium bentonites are not readily available and for this reason they are usually employed only for special applications, e.g., as binder for foundry mold sand and as thickening and thixotropic agent for aqueous media. On the other hand, there are large quantities of calcium bentonites which are not suitable for these special applications, even after an alkaline activation, due to the low content of the primary mineral—montmorillonite.

Litter for pets (e.g., cats) is disclosed for example in EP 0,242,683, and contains an inorganic sorbent to take up liquids, e.g., clay minerals and zeolites. The litter may take the form of compound particles, containing both clay and zeolite particles. The clay minerals used can be smectitic clay minerals, such as natural calcium montmorillonite, with a moisture content of not more than 15%, e.g., from 0.5 to 15%, preferably from 2 to 14%. These particles are mixed with the zeolite particles. The particle mixture can then be compacted, e.g., by pressing between rolls with a pressure of 5 to 500 kN/cm of roll length, or in a press with ia pressure of 0.5 to 200 kN/cm². The molded blanks can then be fragmented into particles of the desired size. Thanks to the use of zeolite, having preferably an effective pore diameter of 3 to 9 Å, the litter should have a good ability to bind odors.

German Patent DE-3,825,905 discloses the use of a mineral material to soak up toxic liquids, emulsions or suspensions. The mineral material consists of clay and/or clay minerals selected from kaolinite, illite, serizite and/or smectite. The material is fired at about 650° C. It has an open porosity of at least about 30 percent by volume. Its mean pore size is between 0.05 and 500 microns. The patent fails to disclose any activating additives for this material.

German Patent DE-1,040,005 discloses a method for the production of molded bodies of molecular sieves where a clay mineral is used as the binder. No activation of the clay mineral is disclosed in this patent.

German Patent 257,397 discloses the use of clay as a binder for molecular sieves which are used for the separation of low molecular weight hydrocarbons. Again, no activation of the clay is disclosed in this patent.

German Patent 4,109,590 discloses an animal litter as well as the method for its production. The animal litter contains synthetic calcium silicate hydrate as the porous material. Odor is suppressed by an admixture of a salt. There is no disclosure of the activation of the smectite clay minerals.

U.S. Pat. No. 4,437,429 discloses an animal litter in the form of separate layers of bentonite and zeolite. The zeolite serves as the odor-binding substance. There is no activation of the bentonite disclosed in this patent.

German Patent No. 4,029,591 discloses a method for producing an absorption material based on a water swellable synthetic polymer with the addition of water resistant substances. Alumina is mentioned as a neutral filler contained in quantities of about 0 to about 80 percent. Once again, no activation of the clay material is disclosed.

German Patent No. 2,930,060 discloses the binding and sanitizing of biologically excreted animal roughage products which contains a calcium silicate hydrate as the active ingredient. Once again, there is no mention of activation of the clay material.

The objective of the present invention is to convert smectitic clay minerals with originally poor swelling capacity, which for this reason have not hitherto been used as sorbents, into sorbents with good water uptake ability.

SUMMARY OF THE INVENTION

This invention is directed to a sorbent based on smectite clay minerals with originally low water uptake ability. These sorbents are characterized in that the smectite clay minerals are chemically converted into the alkaline form with at least one solid ion exchanger. Both organic and inorganic ion exchangers can be used.

DESCRIPTION OF THE INVENTION

It has been found that the mixtures of montmorillonite and zeolite obtained by the process of EP 0,242,683 are not chemically reacted, probably because the moisture content of the montmorillonite was too low. According to the invention, however, the solid ion exchanger in alkaline form activates the smectitic minerals by ion exchange and thus enhances their swelling ability, i.e., their water uptake capacity.

Preferably, the solid ion exchanger has an ion exchange capacity (IEC) of 50 to 1200 meg./100 g, more preferably frog 100 to 1100 meg./100 g.

Preferably, the ion exchanger is a zeolite in alkaline form, which is used in a quantity of about 0.5 to 50%, preferably 5 to 10%, compared to the overall weight of the sorbent in the water-free condition. The quantity depends on the IEC of the zeolite used. Preferably, such zeolites are natural or synthetic zeolites in the sodium form, which are used in a quantity of about 0.5 to 5%, more preferably 0.5 to 3%, compared to the total weight of the sorbent.

Preferably, the smectite clay mineral used as the starting material is a calcium bentonite with a water uptake capacity (in terms of the material dried to a water content of 6%) of at least 50 wt. %, more preferably 60 to 130 wt. %, most preferably 90 to 120 wt. %.

The low water uptake capacity of the bentonites used is primarily caused by the fact that they contain nonswelling components such as quartz, kaolin, mica, feldspar, calcite and dolomite. Moreover, the low water uptake capacity is also caused by the fact that montmorillonite is chiefly present in the form of calcium montmorillonite. During the chemical reaction of the bentonite with the solid ion exchanger in alkaline form, there first occurs a replacement of the calcium ions in the interlayers of the montmorillonite by alkaline ions, especially sodium ions. This ion exchange greatly increases the water uptake capacity of the bentonite, so that after drying it is capable of absorbing large amounts of liquid.

Preferably, the water uptake ability of the sorbent, i.e., the product of the reaction between the bentonite and the ion exchanger in the alkaline form, is at least 20 percentage points higher than that of the bentonite.

The sorbent according to the invention can be obtained by homogenizing the smectitic clay mineral in the moist condition by intensive kneading with the solid ion exchanger in alkaline form, drying, and fragmenting the mixture.

The energy uptake during the kneading is generally about 2–10, preferably 3–6 kWh/ton of kneaded mixture.

The starting mixture of ingredients, in order to assure the shearing necessary for the activation, preferably has a water content of around 20–40 wt. %, more preferably 25–35 wt. %. If the ingredients do not attain this water content, water is added to the starting mixture in order to attain the indicated water content.

The drying of the product of the reaction of smectitic clay mineral and ion exchanger in the alkaline form should be done under gentle conditions. This can be accomplished if the material is exposed to no more than 150° C., preferably no more than 120° C., and the residual water content does not drop below about 4 wt. %, preferably not below about 6 wt. %. The dried product is generally present in the form of rather large pieces, which are usually broken up or granulated. The grain size is usually 0.5–10 mm, preferably 2–6 mm. The fines produced by the fragmentation are usually sifted away and returned to the heading device.

The water uptake capacity of the smectitic clay minerals used as starting ingredients, which is usually under 130%, can be doubled by the invention. Furthermore, the treatment improves the clumping and increases the consistency of the clump of material impregnated with moisture.

The sorbent according to the invention preferably has a water content in the dry state of 4–12, more preferably 4–10 wt. %, and a water uptake capacity of more than 100%, preferably more than 150% (in terms of the dry material with a residual water content of 6%).

Moreover, the sorbent of the invention can be blended with familiar sorbents, e.g., the above-mentioned organic sorbents. Furthermore, the sorbent may contain white pigments and disinfectants. If it is used as animal litter, it can contain other customary additives of animal litter, such as at least one deodorant and/or at least one animal acceptant agent.

Moreover, the subject of the invention is the use of the above-mentioned sorbent as a means of soaking up liquids (e.g., body fluids, oil, liquid chemicals) and as a litter for pets, especially cats.

EXAMPLES

The following examples describe the production and use of the sorbent employed according to the invention:

Test Procedures

The water content of the invented sorbent is determined as follows:

10 g of sorbent are exactly weighed out to 0.01 g in a shallow dish and dried to constant weight in a drying cabinet at 110° C. (at least two hours). Next, the specimen is cooled down to room temperature in a desiccator and weighed:

Evaluation (First weighing/Final weighing)/First weighing×100=water content (%)

The water uptake ability of the invented sorbent is determined by the method of the Westinghouse Company (No. 17-A) (cf. Industrial Minerals, August 1992, page 57). In this process, the sorbent, dried to a residual water content of 6 wt. %, is weighed in (weigh-in E=20 g) in a conical container of fine wire fabric (mesh 60=0.25 mm, diameter 7 cm, height 7.6 cm). Next, the total weight is determined (wire fabric+weigh-in E=$E_1$ in g). The filled fabric is hung for 20 minutes in a water-filled glass tray so that the sorbent is completely submerged. After 20 minutes, the wire fabric is taken out of the water and allowed to drip for around 20 minutes. Immediately after this, the weight of the container with its contents is determined ($E_2$ in g). The evaluation is done as follows:

Water uptake in percent=$(E_2-E_1)/E×100$ $E$

Example 1 (Comparison)

Around 2 kg of freshly excavated crude Ca-bentonite (around 30 wt. % water) with a montmorillonite content of 60 wt. %, in terms of dry mass, and a water uptake capacity of 110% (in terms of a dried material with residual moisture of 6%), is intensively kneaded for 5 minutes in a kneading machine with shearing action (Werner-Pfleiderer blender). The energy consumption was 4 kWh/ton. The resulting agglomerates are dried gently at 75° C. for 4 hours and, with a water content of 6 wt. %, they are broken up in a jaw crusher. The 1–5 mm fraction was sifted out, the material with grain size of >5 mm was again broken up and sifted. The fine fraction of <1 mm was returned to the kneading layout.

The resulting values for water content and water uptake ability are indicated in the following table.

Example 2

The procedure of Example 1 was repeated, except that 15 g, 30 g, and 60 g of a synthetic sodium silicate with sheet structure of composition $Na_2Si_2O_5$ (commercial product SKS-6 from Hoechst AG) was added to the freshly mined calcium bentonite. The sheet silicate SKS-6 had a water uptake capacity of 122% and an IEC of 1000 to 1100 meg./100 g. The values for the water content and the water uptake ability are indicated in the following table.

Example 3

The procedure of Example 1 was repeated, except that 34 g, 68 g, 138 g and 206 g of a synthetic zeolite A in the sodium form (commercial name Wessalith P from the Degussa company) were added to the freshly mined calcium bentonite. The water uptake ability of Wessalith P is 57%, its IEC is 570 meg./100 g.

The results are given in the following table.

Example 4

The procedure of Example i was repeated, except that 100 g of synthetic Na-magadiite (a sodium silicate with sheet structure and formula $Na_7O_{13}(OH)_3 \times 3H_2O$) was added to the freshly mined calcium bentonite. The magadiite had a water uptake capacity of 124% and an IEC of around 80 meg./100 g.

The results are given in the following table.

Example 5

The procedure of Example 1 was repeated, except that 100 g and 200 g of an organic ion exchanger based on polystyrene sulfonic acid in the Na-form (commercial name Lewatit S 100 from Bayer AG) was added to the freshly mined calcium bentonite. The ion exchanger had a water uptake capacity of 2% and an IEC of 170 meg./100 g.

The results are given in the following table.

Example 6 (Comparison)

Following the method of EP 0,242,683, using 2 kg of calcium bentonite with a moisture content of 15% and 60 g of Wessalith P, a mixture was produced. The mixture was molded in a hydraulic press with a pressure of 35 and 70 $kN/cm^2$ and then treated as in Example 1.

The results are given in the following table.

TABLE I

| Example | Material Used | % Ion Exchanger | Water Content (%) | Water Uptake Ability (%) |
| --- | --- | --- | --- | --- |
| 1 | Ca-bentonite untreated | 0% | 6.7 | 115 |
| 2 | SKS-6 | 0.75% | 7.8 | 148 |
|   |       | 1.5%  | 6.3 | 224 |
|   |       | 3.0%  | 8.8 | 282 |
| 3 | Wessalith P | 1.7% | 5.3 | 183 |
|   |       | 3.4% | 5.5 | 220 |
|   |       | 6.9% | 5.8 | 252 |
|   |       | 10.3% | 8.2 | 196 |
| 4 | Na-magadiite | 5.0% | 5.3 | 148 |
| 5 | Lewatit S 100 | 5.0% | 8.9 | 134 |
|   |       | 10.0% | 7.3 | 209 |
| 6 | Ca-bentonite + Wessalith P | 3.0% | 15.0 | 135 (35 $kN/cm^2$) |
|   |       | 3.0% | 15.0 | 131 (70 $kN/cm^2$) (Kilonewtons) |

It can be seen that the water uptake ability of the comparative product is lower than that of the invented product.

What is claimed:

1. A sorbent for soaking up liquids prepared from smectitic clay minerals originally possessing a low water uptake capacity of about 60 to 130 weight % wherein the smectitic clay minerals are reacted with at least one solid ion exchanger which exchanger is in an alkaline form, which ion exchanger is used in a quantity of about 0.5 to 50% in terms of the total weight of the sorbent in its water free condition, wherein the smectitic clay minerals and the ion exchanger combined have a water content of about 20–40 weight percent prior to drying, said sorbent being produced by the process of homogenizing the clay mineral by intensive kneading with at least one solid ion exchanger in an alkaline form to form a mixture, and then drying and fragmenting the mixture to form the sorbent.

2. The sorbent of claim 1 wherein the solid ion exchanger has an ion exchange capacity (IEC) of about 50 to 1200 meg./100 g.

3. The sorbent of claim 1 wherein the ion exchanger is an alkaline zeolite, which is used in a quantity of about 0.5 to 50% in terms of the total weight of the sorbent in its water-free condition.

4. The sorbent of claim 1 wherein the ion exchanger is a sodium zeolite which is used in a quantity of about 0.5 to 5% in terms of the total weight of the sorbent in its water-free condition.

5. The sorbent of claim 1 wherein the smectitic clay mineral is a calcium bentonite with a water uptake capacity, in terms of the smectite dried to a water content of about 6%, of about 60 to 130 wt. %.

6. The sorbent of claim 1 wherein the smectite clay mineral is a calcium bentonite with a water uptake capacity, in terms of the calcium smectite dried to a water content of about 6%, of about 60 to 130 wt. %.

7. The sorbent of claim 1 having a water uptake ability which is at least about 20 percentage points higher than that of the smectitic clay mineral used as the starting material.

8. The sorbent of claim 1 which has a water content in its dry condition of about 4–12 wt. %, and a water uptake ability of more than about 100%, in terms of the dried material with a residual water content of about 6%.

9. The sorbent of claim i which has a water content in its dry condition of about 4–10 wt. %, and a water uptake ability of more than about 100%, in terms of the dried material with a residual water content of about 6%.

10. The sorbent of claim i which has a water content in the dry condition of about 4–12 wt. %, and a water uptake ability of more than about 150%, in terms of the dried material with a residual water content of about 6%.

11. The sorbent of claim i which is present in a granular size of about 0.5 to 10 mm.

12. The sorbent of claim 1 which is present in a granular size of about 2 to 6 mm.

13. The sorbent of claim 1 which contains at least one deodorant.

14. The sorbent of claim 1 which contains at least one animal acceptant agent.

15. The sorbent of claim 1 wherein the energy consumption during the heading is about 2–10 kWh/ton of kneaded mixture.

16. A process for making a sorbent for absorbing liquids prepared from smectite clay minerals comprising:

(a) providing a smectite clay mineral with a water uptake capacity of about 60 to about 130 weight percent, (b) kneading intensively the clay mineral with at least one solid ion exchanger, which exchanger is in an alkaline form, wherein the ion exchanger is used in a quantity of about 0.5 to 50 weight percent in terms of the total weight of the sorbent in its water free condition to produce a kneaded mixture, wherein the energy consumption during kneading is about 2–10 kWh/ton of the kneaded mixture and wherein the water content of the mixture is from about 20–40%, and (c) drying and fragmenting the mixture to form the sorbent.

17. The process of claim 16 wherein the solid ion exchanger has an ion exchange capacity of about 50 to 1200 meg./100 g.

18. The process of claim 17 wherein the ion exchanger is an alkaline zeolite.

19. The process of claim 17 wherein the ion exchanger is a sodium zeolite.

20. The process of claim 16 wherein the smectite clay mineral is a calcium bentonite with a water uptake capacity, in terms of the smectite clay mineral when dried to a water content of about 6%, of at least about 50 wt. %.

21. The process of claim 16 wherein the smectite clay mineral is a calcium bentonite with a water uptake capacity, in terms of the calcium smectite clay mineral when dried to a water content of about 6%, of about 60 to 130 wt. %.

22. The process of claim 16 wherein the sorbent has a water uptake ability which is at least about 20 percentage points higher than that of the smectite clay mineral used as a starting material.

23. The process of claim 16 wherein the sorbent has a water content in its dry condition of about 4–12 wt. %, and a water uptake ability of more than about 100%, in terms of the dried sorbent wherein the sorbent has a residual water content of about 6%.

24. The process of claim 16 wherein the sorbent has a water content in the dry condition of about 4–12 wt. %, and a water uptake ability of more than about 150%, in terms of the dried sorbent with a residual water content of about 6%.

25. The process of claim 16 wherein the sorbent is fragmented to a granular size of about 0.5 to 10 mm.

26. The process of claim 16 wherein the sorbent is fragmented to a granular size of about 2 to 6 mm.

27. The process of claim 16 wherein at least one deodorant is mixed with the sorbent.

28. The process of claim 16 wherein at least one animal acceptant agent is mixed with the sorbent.

29. A sorbent for soaking up liquids prepared from a calcium smectitic clay mineral originally possessing a low water uptake capacity of about 60 to 130 weight % wherein the calcium smectitic clay minerals are reacted with at least one solid ion exchanger which exchanger is in an alkaline form, wherein the alkaline zeolite is a sodium zeolite, which ion exchanger is used in a quantity of about 0.5 to 50% in terms of the total weight of the sorbent in its water-free condition, wherein the calcium smectitic clay minerals and the sodium zeolite when combined have a water content of about 20–40 weight percent prior to drying, said sorbent being produced by the process of homogenizing the clay mineral by intensive kneading with the sodium zeolite to form a mixture, and then drying and fragmenting the mixture to form the sorbent.

30. The sorbent of claim 29 wherein the sodium zeolite is used in a quantity of about 0.5 to 5 percent in terms of the total weight of the sorbent in its water-free condition.

31. The sorbent of claim 29 having a water uptake ability which is at least about 20 percentage points higher than that of the calcium smectitic clay mineral used as the starting material.

32. The sorbent of claim 29 which has a water content in its dry condition of about 4–12wt. percent, and a water uptake ability of more than about 100 percent, in terms of the dried material with a residual water content of about 6 percent.

33. The sorbent of claim 31 which is present in a granular size of about 0.5 to 10 mm.

34. A process for making a sorbent for absorbing liquids prepared from a calcium smectite clay mineral comprising:

(a) providing a calcium smectite clay mineral with a water uptake capacity of about 60 to about 130 weight percent, (b) kneading intensively the clay mineral with at least one solid ion exchanger, which exchanger is a sodium zeolite, wherein the ion exchanger is used in a quantity of about 0.5 to 50 weight percent in terms of the total weight of the sorbent in its water free condition to produce a kneaded mixture, wherein the energy consumption during kneading is about 2–10 kWh/ton of the kneaded mixture and wherein the water content of the mixture is from about 20–40%, and (c) drying and fragmenting the mixture to form the sorbent.

35. The process of claim 34 wherein the sorbent has a water uptake ability which is at least about 20 percentage points higher than that of the calcium smectite clay mineral used as a starting material.

36. The process of claim 34 wherein the sorbent has a water content in its dry condition of about 4–12 wt. percent, and a water uptake ability of more than about 100 percent, in terms of the dried sorbent wherein the sorbent has a residual water content of about 6 percent.

37. The process of claim 34 wherein the sorbent is fragmented to a granular size of about 0.5 to 10 mm.

\* \* \* \* \*